(12) United States Patent
Ding et al.

(10) Patent No.: US 9,608,547 B2
(45) Date of Patent: Mar. 28, 2017

(54) MICROFLUIDIC MANIPULATION AND SORTING OF PARTICLES USING TUNABLE STANDING SURFACE ACOUSTIC WAVE

(71) Applicant: The Penn State Research Foundation, University Park, PA (US)

(72) Inventors: Xiaoyun Ding, State College, PA (US); Tony Jun Huang, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 93 days.

(21) Appl. No.: 13/755,865

(22) Filed: Jan. 31, 2013

(65) Prior Publication Data

US 2013/0192958 A1    Aug. 1, 2013

Related U.S. Application Data

(60) Provisional application No. 61/592,855, filed on Jan. 31, 2012.

(51) Int. Cl.
| | | |
|---|---|---|
| *C02F 1/36* | (2006.01) | |
| *H02N 2/08* | (2006.01) | |
| *B01L 3/00* | (2006.01) | |
| *B07C 5/342* | (2006.01) | |

(52) U.S. Cl.
CPC .......... *H02N 2/08* (2013.01); *B01L 3/502761* (2013.01); *B07C 5/3427* (2013.01); *B01L 3/502707* (2013.01); *B01L 2200/0636* (2013.01); *B01L 2200/0652* (2013.01); *B01L 2300/0864* (2013.01); *B01L 2400/0436* (2013.01)

(58) Field of Classification Search
CPC ....... B01L 2200/0652; B07B 7/00; C02F 1/36
USPC ...... 209/223.1, 225–227, 232; 210/222, 223, 210/695, 748.05
See application file for complete search history.

(56) References Cited

U.S. PATENT DOCUMENTS

| | | | |
|---|---|---|---|
| 5,633,552 | A | 5/1997 | Lee et al. |
| 6,168,948 | B1 | 1/2001 | Anderson et al. |
| 6,537,498 | B1 | 3/2003 | Lewis et al. |
| 6,669,454 | B2 | 12/2003 | Lal et al. |
| 7,601,267 | B2 | 10/2009 | Haake et al. |
| 7,601,287 | B2 | 10/2009 | Adair et al. |

(Continued)

FOREIGN PATENT DOCUMENTS

| | | |
|---|---|---|
| EP | 2145687 | 1/2010 |
| RU | 2243630 | 12/2004 |

(Continued)

OTHER PUBLICATIONS

Nilsson, et al., Acoustic control of suspended particles in micro fluidic chips, Lab on a Chip, 4:131-135, 2004.

(Continued)

*Primary Examiner* — Thomas Morrison
(74) *Attorney, Agent, or Firm* — McNees Wallace & Nurick LLC (57) ABSTRACT

An apparatus for manipulating particles uses tunable standing surface acoustic waves includes a channel defined on a substrate and a pair of variable frequency interdigital transducers. The channel is disposed asymmetrically between the transducers such that the zero order node location is outside of a working region in the channel.

8 Claims, 11 Drawing Sheets

(56) References Cited

U.S. PATENT DOCUMENTS

| | | | |
|---|---|---|---|
| 7,663,607 B2* | 2/2010 | Hotelling et al. | 345/173 |
| 8,573,060 B2 | 11/2013 | Huang et al. | |
| 2001/0055529 A1 | 12/2001 | Wixforth | |
| 2004/0069717 A1 | 4/2004 | Laurell et al. | |
| 2005/0241935 A1 | 11/2005 | Lewis et al. | |
| 2006/0024206 A1 | 2/2006 | Sinha et al. | |
| 2007/0247019 A1* | 10/2007 | Takasaki | 310/313 B |
| 2008/0181827 A1 | 7/2008 | Bassler et al. | |
| 2008/0225634 A1* | 9/2008 | Murakami | 366/114 |
| 2008/0229831 A1 | 9/2008 | Serban et al. | |
| 2008/0245745 A1 | 10/2008 | Ward et al. | |
| 2008/0302732 A1 | 12/2008 | Soh et al. | |
| 2009/0066936 A1 | 3/2009 | Huang et al. | |
| 2009/0158823 A1 | 6/2009 | Kaduchak et al. | |
| 2009/0162887 A1 | 6/2009 | Kaduchak et al. | |
| 2009/0226994 A1 | 9/2009 | Lemor et al. | |
| 2010/0139377 A1 | 6/2010 | Huang et al. | |
| 2010/0193407 A1* | 8/2010 | Steinberg et al. | 209/155 |
| 2010/0200092 A1 | 8/2010 | Beltram et al. | |
| 2010/0304501 A1 | 12/2010 | Lee et al. | |
| 2012/0149126 A1* | 6/2012 | Wilson | B01F 11/0266 436/175 |
| 2012/0160746 A1 | 6/2012 | Thorslund et al. | |

FOREIGN PATENT DOCUMENTS

| | | |
|---|---|---|
| RU | 2253888 C2 | 6/2005 |
| WO | 01/94017 A1 | 12/2001 |
| WO | WO-03089158 | 10/2003 |
| WO | WO-2007128045 | 11/2007 |
| WO | WO-2007128046 A1 | 11/2007 |
| WO | WO-2008083138 A1 | 7/2008 |
| WO | WO-2008118740 A2 | 10/2008 |
| WO | 2010065868 A2 | 6/2010 |
| WO | 2010123453 A1 | 10/2010 |

OTHER PUBLICATIONS

Wang, et al., Single-molecule tracing on a fluidic microchip for quantitative detection of low-abundance nucleic acids, Journal of the American Chemical Society, 127:5354-5359, 2005.

Wang, et al., Dielectrophoresis switching with vertical sidewall electrodes for microfluidic flow cytometry, Lab on a Chip, 7:1114-1120, 2007.

Wiklund, et al., Ultrasonic standing wave manipulation technology integrated into dielectrophoretic chip, Lab on a Chip, 6:1537-1544, 2006.

Shi, et al., Focusing microparticles in a microfluidic channel with standing surface acoustic waves (SSAW), Lab on a Chip, 8:221-223, 2008.

Shi, et al., Acoustic tweezers: patterning cells and microparticles using standing surface acoustic waves (SSAW), Lab on a Chip, 9:2890-2895, 2009.

Mao, et al., Focusing fluids and light: enabling technologies for single-particles detection in the micro/nanoscale, IEEE Nanotechnology Magazine, 2:22-27, 2008.

Mao, et al., "Microfluidic drifting"—implementing three-dimensional hydrodynamic focusing with a single-layer planar microfluidic device, Lab on a Chip, 7:1260-1262, 2007.

Mao, et al., Single-layer planar on-chip flow cytometer using microfluidic drifting based three-dimensional (3D) hydrodynamic focusing, Lab on a Chip, 9:1583-1589, 2009.

Wood, C.D. et al., "Alignment of particles in microfluidic systems using standing surface acoustic waves," Applied Physics Letters, 2008, vol. 92, 044104 (Published online Jan. 30, 2008).

* cited by examiner

MICROFLUIDIC MANIPULATION AND SORTING OF PARTICLES USING TUNABLE STANDING SURFACE ACOUSTIC WAVE

REFERENCE TO RELATED APPLICATION

This patent application claims priority from U.S. provisional patent application Ser. No. 61/592,855, filed Jan. 31, 2012, the entire content of which is incorporated herein in its entirety.

REFERENCE TO GOVERNMENT SUPPORT

This invention was made with government support under Grant No. OD007209, awarded by the National Institutes of Health, and Grant No. ECCS0824183, awarded by the National Science Foundation. The Government has certain rights in the invention.

FIELD OF THE INVENTION

The invention relates to methods and apparatus for the manipulation and sorting of particles using surface acoustic waves, including the concentration, focusing, and characterization of particles, cells, and microorganisms.

BACKGROUND OF THE INVENTION

Improved methods and apparatus for particle sorting, manipulation, and characterization would be useful for numerous applications.

SUMMARY OF THE INVENTION

Examples of the present invention include methods and apparatus for manipulation and sorting of particles. Approaches may be used with various particle types, including microparticles or nanoparticles. Particles may be (or include) components of natural origin, and may include cells (in particular, blood cells), and microorganisms. Examples of the present invention can be used to concentrate and separate particles, such as cells, and in particular cells within human blood. Particles may also include inorganic, polymer, and various other types of particle.

Examples of the present invention include "acoustic tweezers" that can trap and dexterously manipulate single particles, such as microparticles, cells, and microorganisms. The acoustic tweezers use the wide resonance band of chirp (alternatively "chirped") interdigital transducers (IDTs, sometimes termed interdigitated transducers) to achieve real-time control of a standing surface acoustic wave field, which enables flexible manipulation of the particles.

The power density used by example acoustic devices is significantly lower than required for optical tweezers (typically 10,000,000 times less than optical tweezers and 100 times less than optoelectronic tweezers). Acoustic-based particle manipulation methods present excellent and non-invasive alternatives to conventional methods. The acoustic tweezers presented here represent the first acoustic manipulation method to precisely control a single microparticle in two-dimensions.

An example device structure includes a channel adjacent a piezoelectric substrate, located between two orthogonal pairs of chirp interdigital transducers (IDTs). Chirp IDTs have a gradient in their finger period, allowing them to efficiently resonate over a wide range of frequencies. Each pair of chirp IDTs was independently biased with a radio frequency (RF) signal to generate identical surface acoustic waves (SAWs), the interference between them forming a standing surface acoustic wave (SSAW). These SSAWs leak into the adjacent fluid medium and establish a differential pressure field in the fluid, and this field generates an acoustic radiation force, which acts on the suspended particles. The channel is off center with respect to the IDTs such that a zero order pressure node location is outside of the working region of the channel.

The acoustic radiation force drives particles to nodes or anti-nodes in the pressure field, depending on their elastic properties. Most particles are pushed to nodes in the pressure field because of density and/or compressibility variations relative to the suspending fluid medium.

The large bandwidth of the chirp IDTs translates into a wide spectrum of accessible SSAW wavelengths, which defines the large particle manipulation range of the device. Using chirp IDTs with varying input RF frequency, the location of the pressure nodes generated from SSAW interference can be precisely adjusted, and one or more particles trapped in the pressure node can be freely manipulated in two dimensions. The trajectory of particles within a fluid flow may also be precisely adjusted, allowing improved particle sorting.

A further example device structure includes a channel located between a pair of variable frequency interdigital transducers (IDTs). The channel has a channel input and a plurality of channel outputs. The pair of IDTs is biased with a RF signal to generate identical surface acoustic waves (SAWs), the interference between them forming a standing surface acoustic wave (SSAW) within a working region of the channel, and establishing a differential pressure field in the fluid. By adjusting the pressure field through frequency adjustments of the driving signal, the trajectory of particles flowing through the channel can be directed into any desired channel output. Sorting may be electronically controlled and based on one or more particle characteristics determined for the particles in the channel. Hence, efficient particle sorting is possible, including sorting of blood cell components, including fluorescence-activated cell sorting.

Example applications include particle sorting (including cell sorting), flow cytometry, and the like. Examples of the present invention may be combined with microfluidic particle focusing devices to provide improved particle sorting, including improved flow cytometers. An improved flow cytometer may include a particle focusing stage, a particle characterization stage, and a particle sorting stage. The sorting stage may be in electrical communication with the characterization stage so that different particles can be sorted based on a detected particle parameter.

An example apparatus for manipulating a particle comprises a substrate (e.g. a substrate supporting a SSAW, such as a piezoelectric substrate), a channel defined on the substrate (such as a microchannel having at least one cross-sectional dimension less than 1 mm), and a spaced apart pair of variable frequency or chirp interdigital transducers (IDTs) formed on the substrate with the channel located between, and off center with respect to, the pair of IDTs. An electronic control circuit may be provided to drive the pair of IDTs to generate a standing surface acoustic wave in the working region of the channel. The channel is configured to receive a fluid suspension including the particle, and the position of the particle is adjustable by varying a frequency and/or phase of the standing surface acoustic wave (SSAW). The substrate may provide a wall of the channel. The particle may be a polymer particle, cell (such as a blood cell), microorganism, particle assembly, or other object having an elastic property differing from a surrounding support medium. The support medium may be a fluid, more particularly a liquid.

In some examples, the channel is a flow channel having an input channel and a plurality of output channels, the particle being directed into a selected channel of the plurality of output channels by varying the frequency of the standing surface acoustic wave. Examples include improved cell sorting apparatus and methods, including improved blood sorting.

The channel may be located between a first pair of interdigital transducers generating a first SSAW and a second pair of interdigital transducers generating a second SSAW, the first and second SSAWs (e.g. orthogonal SSAWs) having first and second frequencies adjustable to control the position of the particle in at least two dimensions.

A variable frequency or chirped IDT may include first and second interdigitated electrodes supported by the substrate, driven by a control signal applied between the electrodes by an electronic control circuit. The finger spacing between neighboring electrode fingers varies as a function of position on the substrate, so that the chirp IDT may have a broad frequency response. A variable frequency IDT for use with the present invention may have a tunable frequency range of at least 10 MHz, such as at least 1 MHz. An example chirp IDT may have an operating bandwidth of at least 10 MHz, and operating frequencies in the range 1 MHz-100 MHz, more particularly 5 MHz-50 MHz. Example chirp IDTs operated in the range 18.5 MHz to 37 MHz, corresponding to SAW wavelengths of approximately 100 μm to 200 μm and a manipulation resolution of approximately 1 μm. Clearly, the term acoustic, in this context, does not restrict the frequency range to human audible frequencies.

A method of manipulating a particle includes introducing a fluid suspension including the particle to a channel, the channel being proximate (e.g. adjacent) a substrate, generating a SSAW in the substrate using a pair of chirp IDTs, and manipulating the particle by adjusting the frequency of the SSAW. The method may be a method of particle sorting, the channel being a flow channel, the frequency of the SSAW being adjusted to direct a trajectory of the particle to a selected output channel of a plurality of output channels. The particle may be a cell, such as a blood cell. A second SSAW may be generated in the substrate using a second pair of chirp IDTs, the particle being further manipulated by adjusting the frequency of the second SSAW.

DETAILED DESCRIPTION OF THE INVENTION

Examples of the present invention include methods and apparatus for the high-precision sorting of micro/nano particles, including but not limited to cells (such as blood cells, including mammalian blood cells such as human blood cells and bovine blood cells) and microorganisms, using tunable standing surface acoustic waves. Example apparatus and methods use a single-layer planar microfluidic device, which may be fabricated using standard soft-lithography techniques. Compared to currently existing technologies (e.g. traveling surface acoustic wave sorting, optical tweezers sorting and electrokinetic sorting), these approaches provide much higher precision, significant simplification for device fabrication, less invasiveness, and reduction of cost.

Examples of the present invention can be used to concentrate, manipulate, sort, and separate particles, such as cells, and in particular cells within human blood. Cell separation, especially human whole blood cell separation, is very important in biomedical research and diagnostics. Using an acoustic manipulation technique, extensive applications are possible, including cells/particles sorting, cells/particles separation, and cells/particles concentration.

Examples of the present invention include "acoustic tweezers" that can trap and dexterously manipulate single microparticles, cells, and entire organisms such as *Caenorhabditis elegans* (*C. elegans*) in a microfluidic chip. These acoustic tweezers use the wide resonance band of variable frequency (also called chirp or chirped) interdigital transducers (IDTs) to achieve real-time control of a standing surface acoustic wave field, which enables flexible manipulation of microparticles, cells, and organisms. The power density required by some embodiments of the acoustic device of the present invention is significantly lower than its optical counterparts (10,000,000 times less than optical tweezers and 100 times less than optoelectronic tweezers), which renders the technique noninvasive and amenable to miniaturization. Cell-viability tests were conducted to verify the non-invasive nature of this approach. With their advantages in non-invasiveness, miniaturization, and versatility, the acoustic tweezers presented here can be valuable for many disciplines of science and engineering.

Acoustic-based particle manipulation methods are excellent alternatives to conventional methods. Compared to their optical, electrical, or magnetic counterparts, acoustic-based methods are relatively non-invasive to biological objects and work for most microparticles regardless of their optical, electrical, or magnetic properties. No previous acoustic approach, however, has achieved the dexterity of optical tweezers; in other words, no previous acoustic-based method is capable of manipulating single microparticles or cells along an arbitrary path. The acoustic tweezers presented here represent the first acoustic manipulation method to precisely control a single microparticle in two-dimensions. Additionally, the inventors have demonstrated similar manipulation of biological objects including cells and entire organisms (*C. elegans*). *C. elegans* is an attractive model organism for many biological and medical studies, mainly because of its relatively small size (~1 mm long), optical transparency, and well-mapped neuronal system.

Conventionally, trapping and manipulating *C. elegans* has proven to be difficult and often involves potentially harmful anesthetics, vacuum, cooling, or direct-contact mechanical procedures. In contrast, acoustic tweezers in accordance with the present invention rely on a working mechanism, which endows them with excellent flexibility in both the type and size of objects that can be manipulated.

Figure 1:
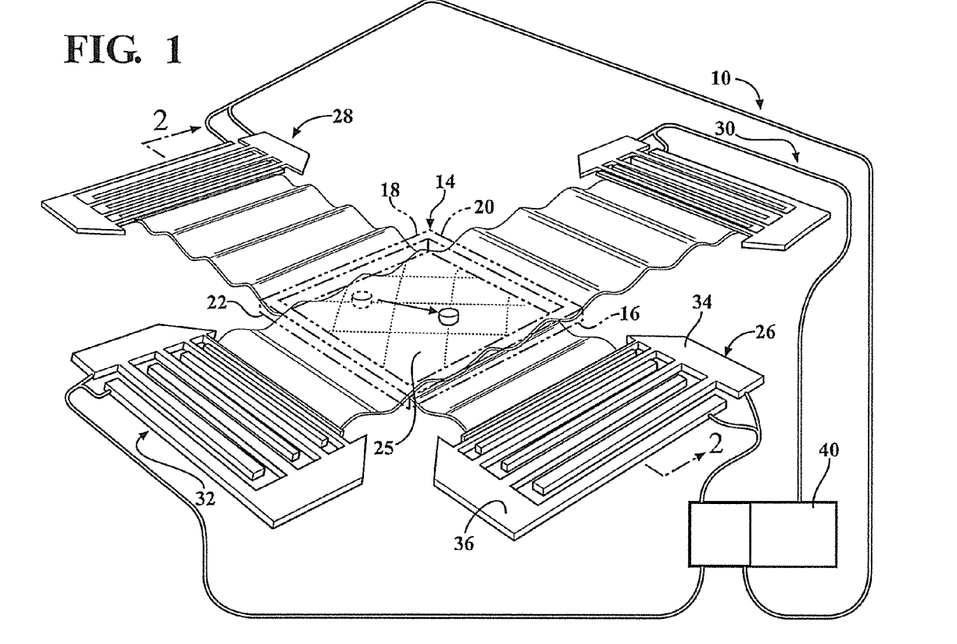
FIG. 1 is a perspective view of an embodiment of an apparatus for manipulating particles in accordance with the present invention.
Figure 2:
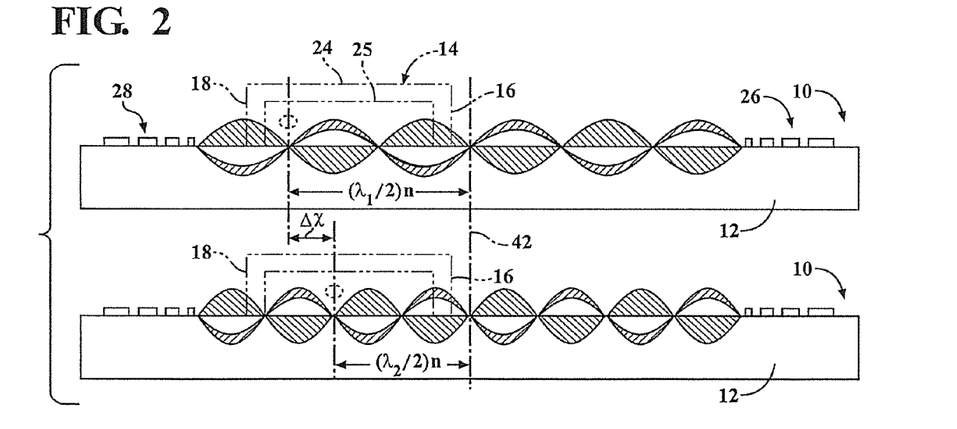
FIG. 2 shows two cross sectional views of the embodiment of FIG. 1, taken along lines 2-2, showing how changes in standing surface acoustic waves influence movement of a particle.

FIG. 1 illustrates an embodiment of an apparatus in accordance with the preset invention. The illustrated embodiment corresponds to a working example fabricated and tested by the inventors, though it represents merely one example of many possible embodiments. The version in FIG. 1 may be referred to as an acoustic tweezers 10, and is an example of an apparatus for manipulating particles using tunable standing surface acoustic waves. FIG. 2 shows two cross sectional views of the acoustic tweezers 10. The tweezers include a substrate 12, shown in FIG. 2, supporting other components of the invention. In this example, the substrate is a lithium niobate (LiNbO3) piezoelectric substrate. A channel 14 is defined on the substrate 12. In the Figures, this channel is shown in dot-dash lines to represent that it may be generally transparent, both visually and acoustically. In this example, the channel 14 is a 2.5×2.5 mm polydimethylsiloxane (PDMS) channel that is bonded to a lithium niobate (LiNbO3) piezoelectric substrate.

The channel 14 may be said to have a first side 16, and opposed second side 18, a third side 20 and an opposed fourth side 22. In this embodiment, the channel is generally square, and the first and second sides 16 and 18 are generally orthogonal to the third and fourth sides 20 and 22. In this embodiment, the channel also has a top 24. The walls and the top cooperate to enclose a working region 25. The substrate 12 may define the bottom of the enclosed working region. The working region may further have one or more inlets and outlets to allow a fluid suspension to be added to and removed from the working region 25. This fluid suspension would include particles to be manipulated.

In this embodiment, the channel 14 is disposed asymmetrically between two orthogonal pairs of chirp interdigital transducers (IDTs). A first IDT 26 is spaced from the first side 16, a second IDT 28 is spaced from the second side 18, a third IDT 30 is spaced from the third side 20 and a fourth IDT is spaced from the fourth side 22. Each of the IDTs is formed on the piezoelectric substrate 14 and when energized by an input signal creates a vibration in the substrate. This vibration passes into the working region.

Chirp IDTs have a gradient in their finger period, which allows them to efficiently resonate at a wide range of frequencies. For example, the first IDT 26 has two electrodes 34 and 36. Each of these electrodes has fingers and these fingers are interdigitated with the fingers of the other electrode. The spacing between the fingers varies as a function of the distance from the channel, with the closer fingers being closely spaced and the farther fingers being spaced farther apart. In operation, each pair of chirp IDTs was independently biased with a radio frequency (RF) input signal to generate identical surface acoustic waves (SAWs). For example, the first IDT 26 and second IDT 28 are both provided with the same input signal, so that they produce identical SAWs. The interference between the SAWs forms a standing surface acoustic wave (SSAW) on the substrate. These SSAWs leak into the adjacent fluid medium in the working region 25 and establish a differential pressure field in the fluid; this field generates an acoustic radiation force, which acts on suspended particles. As used herein, the term "variable frequency IDT" means and IDT in which the frequency and/or phase is adjustable. An electronic control circuit is represented at 40, wired to each of the electrodes. This circuit may take a variety of forms.

The acoustic radiation force drives particles to nodes or anti-nodes in the pressure field, depending on their elastic properties. Most objects, including polystyrene beads, cells, and *C. elegans*, are pushed to nodes in the pressure field because of density and/or compressibility variations relative to the background medium. However, these examples do not limit the present invention. Any type of particle or structure with elastic properties differing from the suspending fluid medium may be manipulated or sorted by this approach. Examples of the present invention can be used for the manipulation and sorting of various type of particle, including inorganic particles, polymer particles, biological structures such as cells (including blood cells), and microorganisms, micelles, lipid structures, bubbles (which may tend to be directed to antinodes), any dispersed phase component (including aerosols and latexes), food particles, nano/microparticle assemblies, functionalized particles, other biological structures, and the like. The orthogonal pairs of IDTS allow manipulation in two dimensions.

The large bandwidth of the chirp IDTs translates into a wide spectrum of accessible SSAW wavelengths, which defines the large manipulation range of the device. Using chirp IDTs with varying input RF frequency and/or phase, we can shift the location of the pressure nodes generated from SSAW interference. As a result, a single particle/cell/*C. elegans* that is trapped in the pressure node can be freely manipulated in two dimensions.

FIG. 2 shows a cross sectional view of the apparatus 10 of FIG. 1, and shows the SSAW and related pressure field along one dimension (x-axis) of the device. We refer to the stationary pressure node in the centre of the two IDTs as the 0 order node, or zero order node, (shown as a long dash dot line at 42). The zero order node location 42 is intermediate the IDTs 26 and 28. In preferred embodiments, channel 14 is disposed asymmetrically between the IDTs 26 and 28 such that the zero order node location 42 is located outside the working region 25. The same is true with respect to IDTs 26 and 28. From the zero order node location 42, the nodes progress to the 1st order, 2nd order, 3rd order, etc. outward from the center. Because the zero order node location 42 is outside the working region, higher order nodes occur in the working region and may be manipulated by changing the frequency of the input signal to the IDTs. Absolute node location for an nth order pressure node is directly related to the SAW wavelength, which is directly related to the signal frequency. All higher-order pressure nodes can be moved simply by altering the applied signal frequency. The node displacement is depicted in FIG. 2 for a frequency change from f1 to f2. It is clear that the particle displacement is directly proportional to the node order.

Figure 3A:
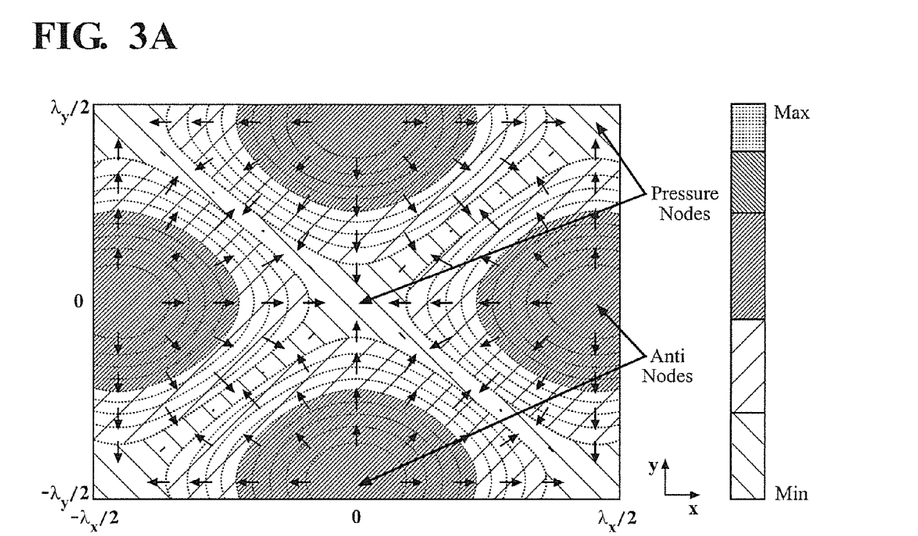
FIG. 3A illustrates a simulated pressure field for a portion of working region of an embodiment of the present invention.
Figure 3B:
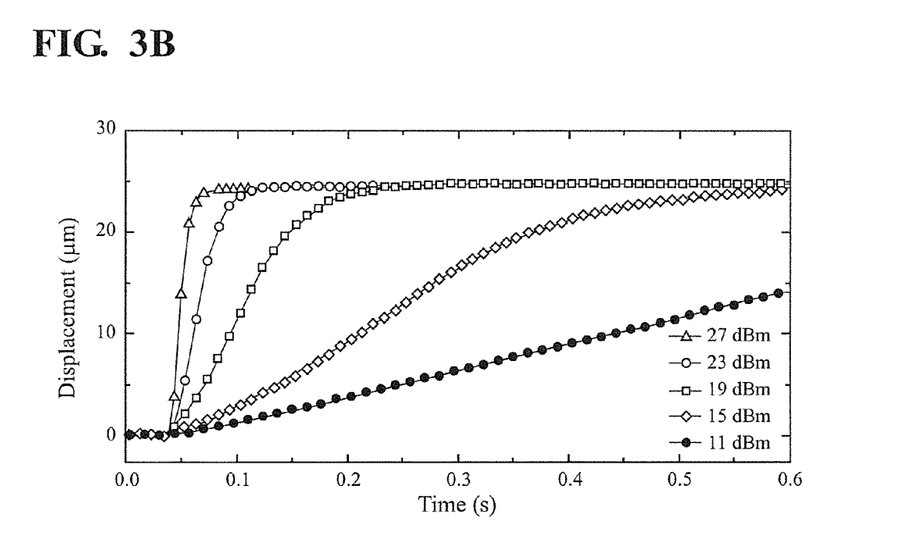
FIG. 3B is a graph one dimensional particle motion caused by a constant frequency change at varying applied acoustic power levels.
Figure 3C:
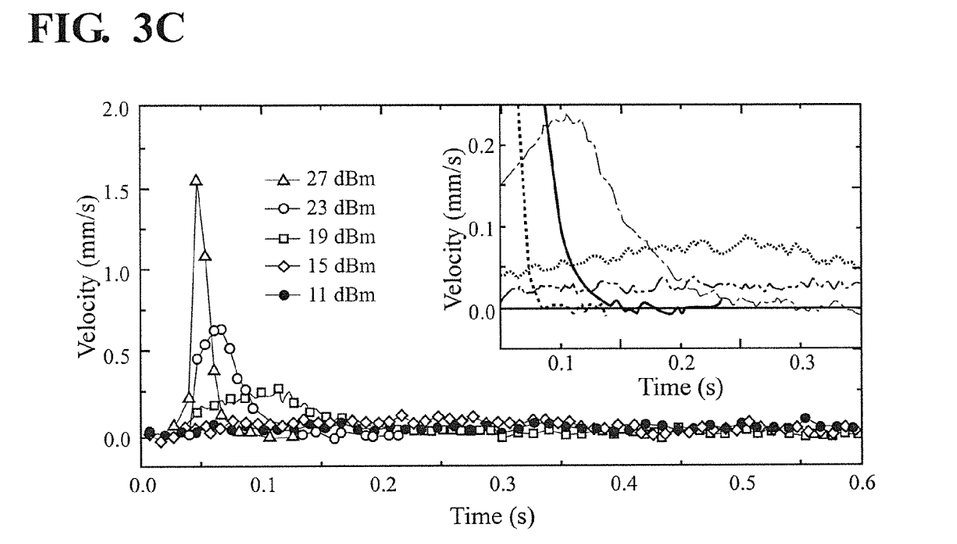
FIG. 3C is a graph showing the velocity of a particle, corresponding to the displacement curves in FIG. 3B.
Figure 3D:
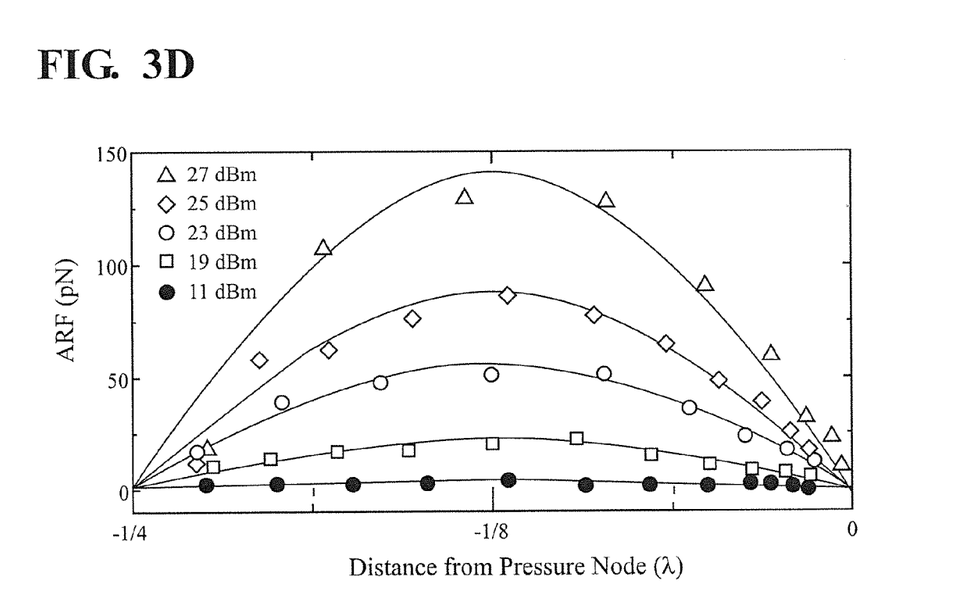
FIG. 3D is a graph showing experimentally measured acoustic radiation force (ARF) on the particles as a function of distance from the nearest pressure node (discrete points) at different input power levels, with the fitted curves being in solid lines.

FIG. 3A shows a simulated two-dimensional pressure field surrounding each pressure node, with arrows denoting the acoustic radiation force vectors. The simulation results indicate that a particle between adjacent pressure anti-nodes will experience an attractive force toward the pressure node between them. FIG. 3B examines one-dimensional particle motion under varying acoustic power in response to the same frequency shift. FIG. 3C plots the particle's velocity during this process. The inset provides data that is smoothed with a moving-average filter of five data points. At the lower end of the force spectrum (11 dBm curve in FIG. 3c), a 10-μm fluorescent polystyrene bead can be continuously moved with velocity of ~30 μm/s, while at the opposite end of the force spectrum (27 dBm curve in FIG. 3C), particle velocities as high as ~1600 μm/s are achieved. FIG. 3D provides experimentally measured acoustic radiation force (ARF) on the particles as a function of distance from the nearest pressure node (discrete points) at different input power levels. The fitted curves are shown in solid lines. In single-step manipulation of single particle corresponding to the data presented in FIGS. 3B, C and D, single-step manipulation of a 10-μm-diameter polystyrene bead with an input power of 15 dBm is demonstrated.

Figure 3E:
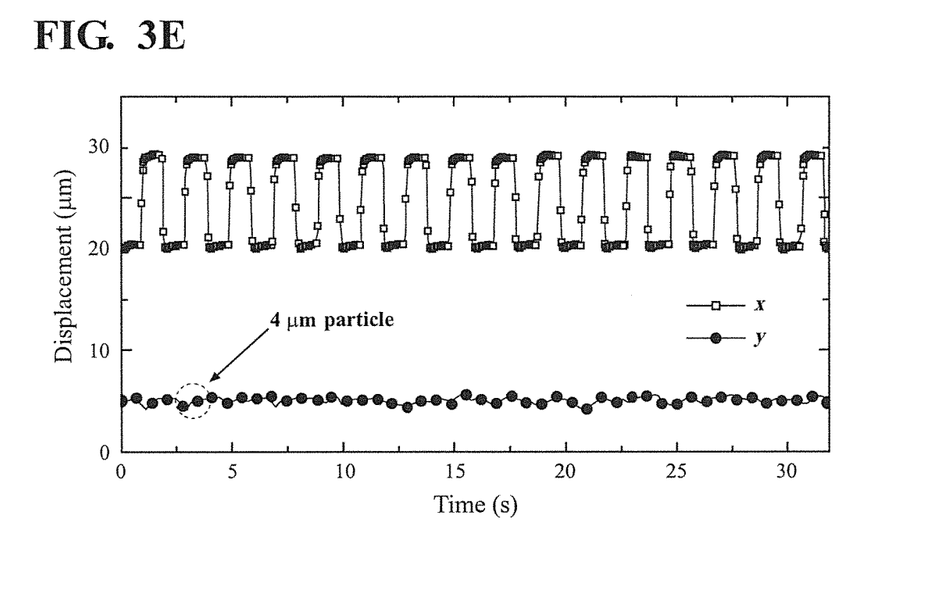
FIG. 3E is a graph showing particle displacement versus time as a demonstration of reproducible particle motion.

The inventors conducted a force analysis to quantitatively determine the magnitude of the acoustic radiation force exerted on the particles at different power inputs. The experimental radiation force is plotted in FIG. 3D, calculated from the difference between the drag force (found using the velocity data in FIG. 3C) and the time derivative of particle momentum (also calculated from the velocity data in FIG. 3C). The force exerted on a 10-μm particle (shown in FIG. 3D with discrete points) fits well with the theoretical sinusoidal dependence of the force on the distance to the pressure node (solid lines). Since the acoustic radiation force depends on particle size, compressibility, and SSAW amplitude, the force exerted on particles (reaching as high as 150 pN for a 10-μm particle) can be predicted and tuned. The displacement reproducibility is exhibited in FIG. 3E, where a 4-μm particle is moved back and forth in the x-direction, while being held stationary in the y-direction. The displacement can be reproduced to within 1 μm over hundreds of cycles. Lastly, the inventors repeatedly stepped a pressure node in the positive x-direction to demonstrate particle translation over a larger length scale (~100 μm in FIG. 3f), again holding the y-direction constant.

The reproducibility was tested using a single 4-μm particle, which was trapped and successfully moved back and forth in the x-direction by switching the frequency input to a single pair of IDTs from 28.3 MHz to 28.4 MHz with a power of 27 dBm. This demonstrated the excellent reproducibility of the acoustic tweezers, and corresponding data is given in FIG. 3e.

Figure 3F:
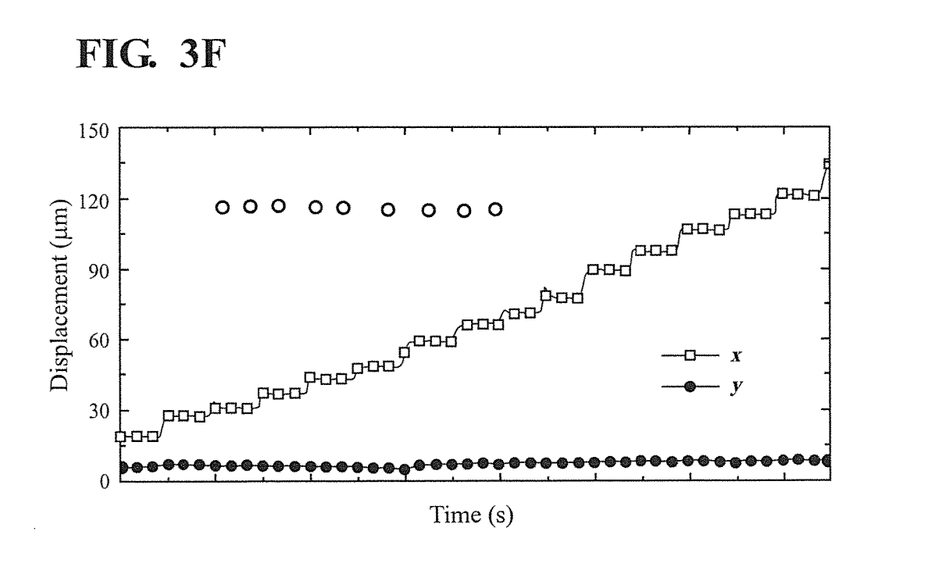
FIG. 3F is a graph showing particle movement versus time as a demonstration of continuous particle translation along an x-direction, in well defined steps, while holding the particle stationary in the y-direction.
Figure 4A:
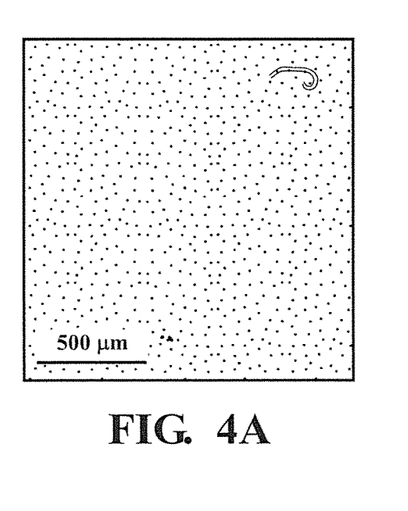
FIGS. 4A-4D are drawings of images showing independent two-dimensional manipulation of a single nematode.
Figure 4B:
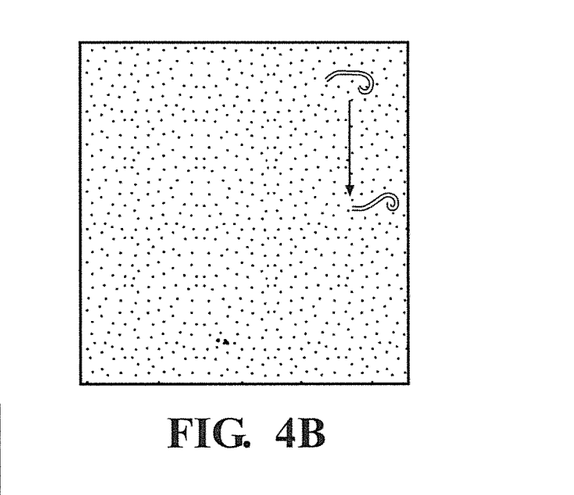
Figure 4C:
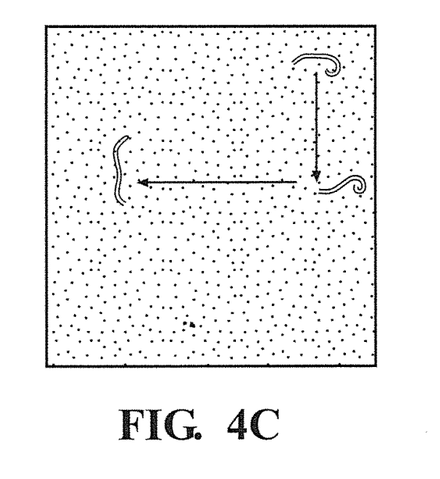
Figure 4D:
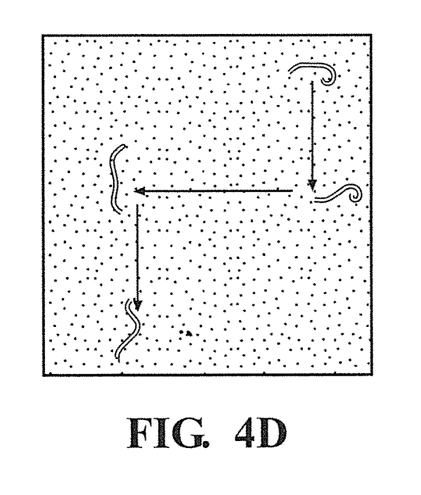

Multi-step manipulation of single particle was shown by stepping the frequency of one pair of IDTs while fixing the frequency on the orthogonal pair, achieving one-dimensional particle translation with a 7-μm particle in the positive x-direction. The results show that long-range manipulation can be achieved independently in the x and y directions; the stacked images are shown in the inset of FIG. 3F. The data collected used 20 dBm input power.

The RF signal used to power the chirp IDTs was created by a function generator to manipulate 10-μm polystyrene beads (~0.5 nW/μm2 for particle velocities of ~30 μm/s). The power density required by this technique is much lower than its optical counterparts (10,000,000 times less than optical tweezers and 100 times less than optoelectronic tweezers). The working frequency range of the chirp IDTs used in our setup was 18.5 MHz to 37 MHz, corresponding to SAW wavelengths of approximately 100 μm to 200 μm and a manipulation resolution of approximately 1 μm. In some embodiments, it is preferred that the IDTs have a tunable frequency range of at least 10 MHz. The direct correlation between frequency resolution and displacement resolution indicates that the acoustic tweezers could potentially produce sub-micron displacements. In addition, the working manipulation range of the device covers the entire microfluidic channel region (2.5×2.5 mm), with the capability to expand to centimeter level.

To demonstrate single particle/cell manipulation in two dimensions, the inventors tuned the input frequency of both pairs of orthogonally arranged chirp IDTs (as shown in FIG. 1). Each pair of chirp IDTs independently controls particle motion along a single direction, thus the orthogonal arrangement enables complete control in the device plane. In addition to cells and microparticles, these acoustic tweezers can also be used to manipulate entire multicellular organisms, such as C. elegans. This task is challenging for optical techniques because high power density is applied over larger areas, leading to impractical total power requirements.

FIGS. 4A-D shows trapped, stretched, and independently translated C. elegans in the x and y directions. Manipulation of single C. elegans was demonstrated in two dimensions. The C. elegans was trapped and stretched by turning on RF signals and was moved in y and x directions independently by sweeping the input signal frequency. When we turned off the input power, the C. elegans recovered again and swam freely after being exposed in the SSAW radiation for ~3 min. The power used was 29 dBm and the sweep rate was 0.5 MHz/s with a frequency step of 0.1 MHz. This demonstrates another operation mode of the present invention, wherein the frequency is swept, and the sweep may be repeated, to urge particles in a particular direction.

Acoustic tweezers can also simultaneously manipulate large numbers of particles. Parallel manipulation of multiple particles can be achieved with clusters of particles at a single pressure node, single particles at different pressure nodes, or clusters of particles at distinct pressure nodes. This manipulation can occur over a variety of length scales (from μm to mm). Results showed that while the acoustic tweezers are capable of dynamically manipulating single particles/cells/ organisms, they are also capable of simultaneously manipulating more than tens of thousands of particles. The low power consumption and simple stricture/setup of these acoustic tweezers can be integrated with a small RF power supply and basic electronics to function as a fully integrated, portable, and inexpensive particle-manipulation system. If combined with flow-based microfluidics, the device could sort, identify, and characterize cells and other biological particles. Additionally, the acoustic tweezers' non-invasiveness, versatility, and dexterity render them an excellent platform for a wide range of applications in both the biological and physical sciences.

In a further experiment, the manipulation device was mounted on the stage of an inverted microscope (Nikon TE2000U). Two RF signals were generated from two function generators (Agilent E4422B) to drive the two pairs of chirp IDTs independently. Solutions of bovine red blood cells (~6 μm in diameter, Innovative Research, Inc.), C. elegans, or fluorescent polystyrene beads with diameters of 2 μm, 4 μm, 7 μm, 10 μm, and 15 μm were injected into the channel before the RF signals were applied. A CCD camera (CoolSNAP HQ2, Photometrics, Tucson, Ariz.) and a fast camera (Casio EX-F1) were connected to the microscope to capture the manipulation process. To further exam the non-invasiveness of our technique, cells viability tests were conducted by exposing HeLa cells under SSAW radiation at the power of 23 dBm for 6 s, 1 min, 10 min, respectively.

FIGS. 5A-5I show the major steps involved in the fabrication of the acoustic tweezers device: (1) the fabrication of chirp interdigital transducers (IDTs), and (2) the fabrication of polydimethylsiloxane (PDMS) microchannel.

Figures 5A, 5E:
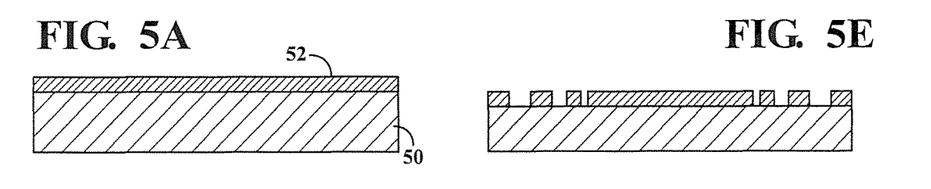
FIGS. 5A-5I are cross sectional views of an exemplary fabrication process for a variable frequency interdigital transducer and for a PDMS-based microchannel.
Figures 5B, 5F:
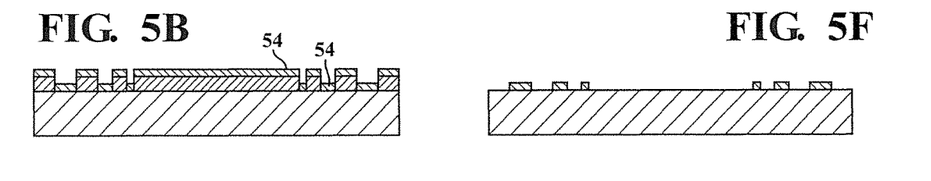
Figure 5C:
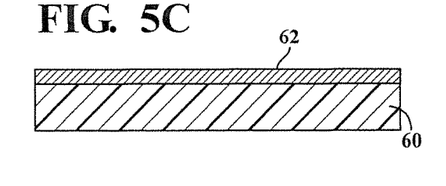
Figures 5D, 5H:
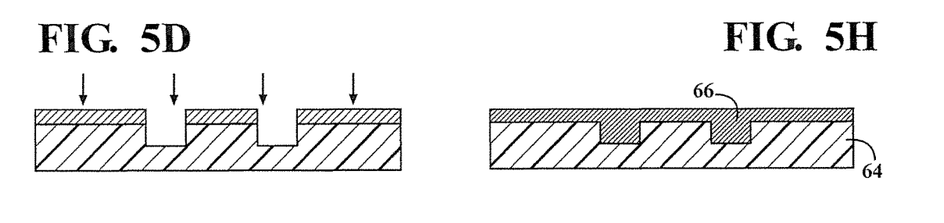

FIG. 5A-D shows the fabrication process of the chirp IDTs. A layer of photoresist 52 (SPR3012, MicroChem, Newton, Mass.) was spin-coated on a Y+128° X-propagation lithium niobate (LiNbO3) wafer 50, as shown in FIG. 5A. This was then patterned with a UV light source, and developed in a photoresist developer (MF CD-26, Microposit), resulting in the structure shown in FIG. 5B. A double-layer metal 54 (Ti/Au, 50 Å/800 Å) was subsequently deposited on the wafer using an e-beam evaporator (Semicore Corp), as shown in FIG. 5C, followed by a lift-off process to remove the photoresist and form the IDTs, shown in FIG. 5D.

Figure 5G:
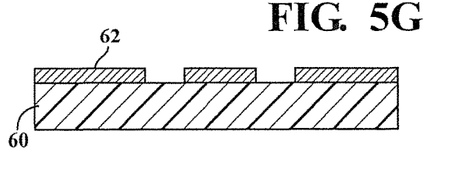
Figure 5I:
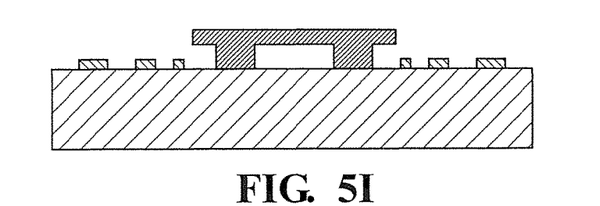

The PDMS microchannels were fabricated using standard soft-lithography and mold-replica techniques, as shown in FIGS. 5E-H. The silicon substrate 60 for the microchannel mold was patterned by photoresist 62 (Shipley 1827, MicroChem, Newton, Mass.) and etched by a Deep Reactive Ion Etching (DRIE, Adixen, Hingham, Mass.) as shown in FIG. 5G This resulted in a mold 64 for silicone 66. Sylgard™ 184 Silicone Elastomer Curing Agent (Dow Corning, Midland, Mich.) and Sylgard™ 184 Silicone Elastomer Base were mixed at an 1:10 weight ratio, cast onto the silicon mold, and cured at 65° C. for 30 min. Finally, the IDT substrate and PDMS were treated with oxygen plasma and bonded together, as shown in FIG. 5I. Fabrication approaches described in U.S. patent application Ser. No. 12/631,059, filed Dec. 4, 2009, may also be used to fabricate devices according to examples of the present invention.

The inventors examined the viability of HeLa cells in high-power (23 dBm) SSAW fields for 6 s, 1 min, and 10 min. The results indicate that after 10 min in the SSAW field the cell-survival rates were 99.02%, only 0.33% lower than a positive control group. As control experiments, cell viability was examined after being at room temperature for 2 h and at 65° C. for 48 h. Each group was tested five times. Viability for the three time periods was 100.0%, 99.3%, and 99.02%, respectively.

The present invention also provides an on-chip microfluidic device for cell sorting using tunable standing surface acoustic waves (SSAWs). The device is integrated on a PDMS device, and combines the advantage of fluorescence activated cell sorting (FACS) and fast electronic control of cell diversion. An example apparatus directs cells precisely into three different outlets by shifting the position of SSAWs through controlling the input frequency within the wide working range of chirp IDTs. The sorting device uses the contrast in the material properties of directed objects and the continuous phase, so it operates in continuous flow without additional prior labeling of the objects with markers such as polarizable or magnetic beads. Cells are sorted directly without prior encapsulation into liquid droplet compartments as in traditional FACS.

Cell sorting is important for basic cell studies, cancer research, clinical medicine, and transplantation immunology. In fluorescence activated cell sorters (FACS), cells are encapsulated into small liquid droplets, which are then selectively labeled with an electric charge and are sorted at high speed in an electric field. These droplet-based sorters, however, typically require large number of cells to achieve high yield, such large dead volume makes it difficult to separate precious cells from small volume sample. In some cases, for example, the cells are to be cultured after sorting, loading cells in droplets is not desirable. These drawbacks, plus high cost, can be avoided by using direct cell-sorting in low cost disposable microfluidic devices.

Several methods have been used for active control of cell movement or flow in microfluidic sorters. The fluid electrokinetic mobilization based cells sorter has the difficulty of maintaining cell viability, and the limitation of buffer incompatibility. Hydrodynamic flow control relying on fluidic valves has been used for live cells sorting. However, the complicated structure, low response time, and the waste of relatively large volume of liquid in each switch cycle limit its application. In magnetic activated cell sorting, magnetic beads are labeled to target cells prior to sorting in a magnetic field. Optical force switching uses the radiation pressure forces of the optical device to maneuver a particle or cell. But these devices require complex configurations and are relatively expensive making it undesirable for portability.

Acoustophoresis has been used in microfluidic for particle/cell focusing, trapping, separation, extraction, and sorting in a continuous flow situation as a safe and noninvasive alternative. Using a tunable SSAW, a novel hybrid method was demonstrated combining the advantages of fast electronic response and redundant external labeling or droplet encapsulation.

Using surface acoustic waves (SAW) for droplets/cells sorting has been reported recently. However, the underlying physical working mechanisms of SAW and our tunable standing surface acoustic waves (SSAW) are significantly different. In former case, SAW propagates on the surface of substrate, and leaks into liquid as longitudinal wave; this leakage wave cause acoustic streaming as a result of the compressibility of the bulk fluid. The acoustic streaming actuates the bulk fluid where the object is embedded, and achieves the sorting of the object. In contrast, an apparatus in accordance with the present invention directs cells into specific channels by controlling input frequency. The inventors demonstrated 3-channel precise sorting of fluorescence particles and bovine red blood cells using tunable SSAW. The prior SAW based sorting method, including most of other sorting techniques, only have two outlet channels: the collect and waste channel, which means they can only separate one kind objects from the sample. The method disclosed here has the capability of collecting multi series of objects from a target sample.

Figure 6A:
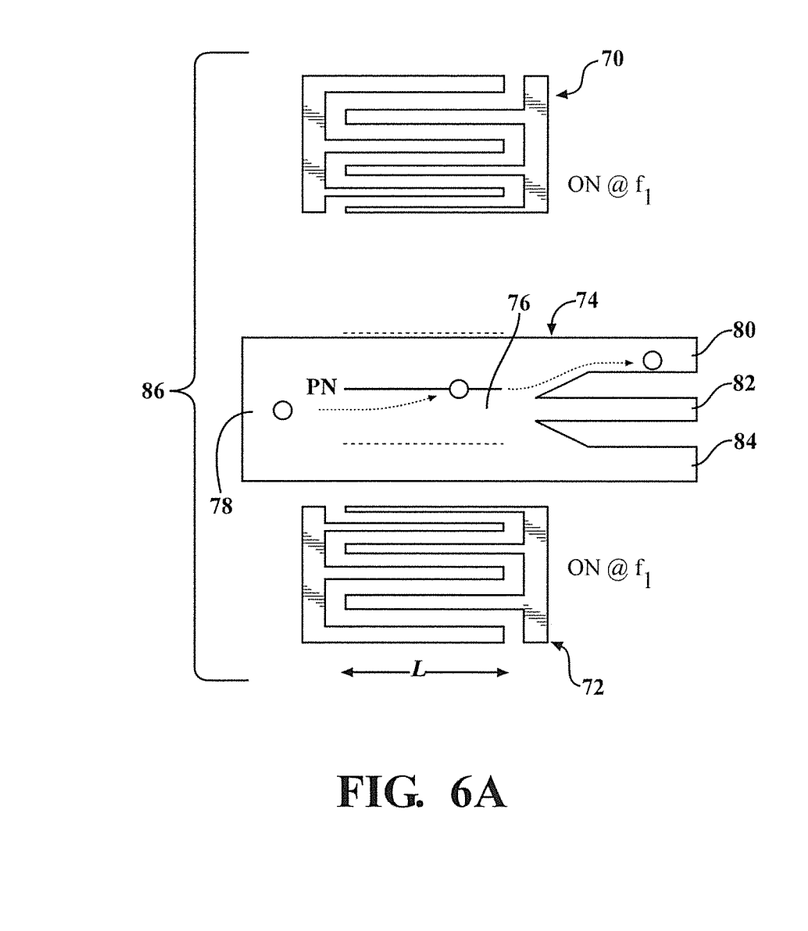
FIG. 6A is a schematic of an embodiment of an apparatus for manipulating particles in accordance with the present invention, wherein particles are manipulated in a flow channel so as to selectively be directed into one of a plurality of outlet channels.
Figure 6B:
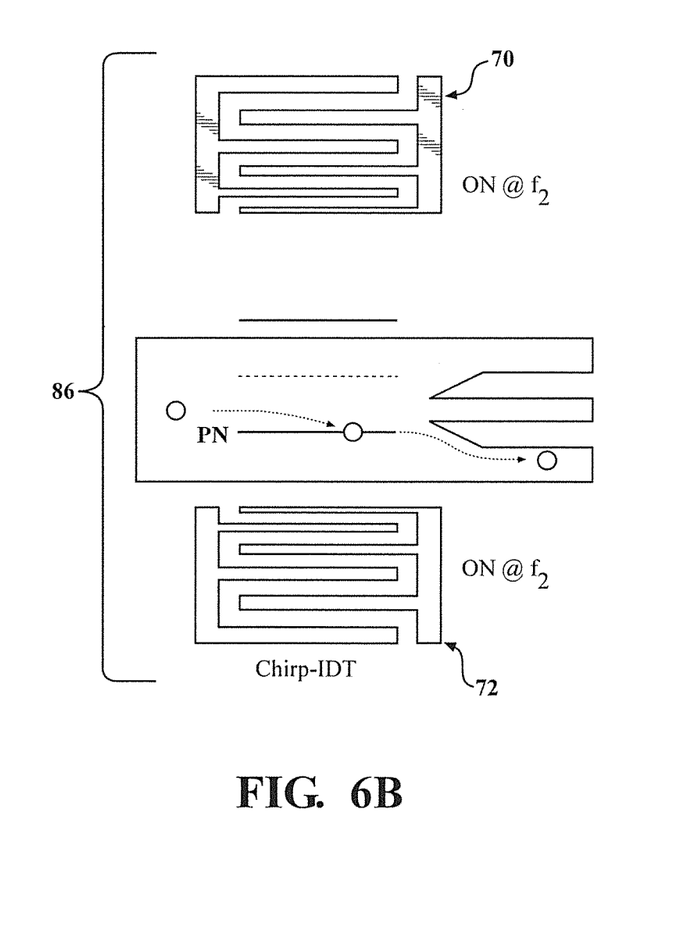
FIG. 6B is a schematic similar to FIG. 6A wherein particles are manipulated to be directed into a different one of the plurality of outlet channels.
Figure 7A:
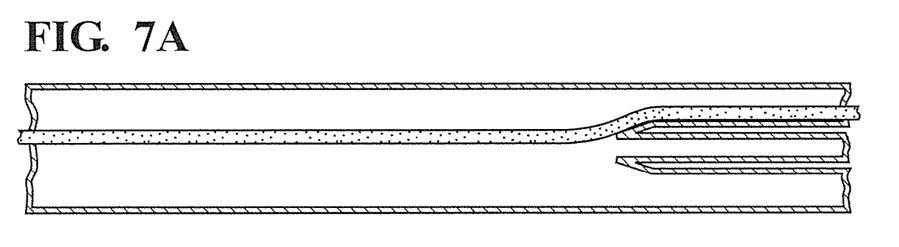
FIGS. 7A-7C is a drawing of images showing florescence particle sorting selectively into one of three outlet channels.
Figure 7B:
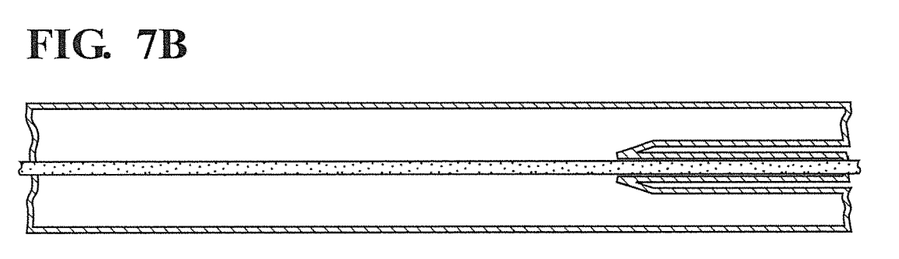
Figure 7C:
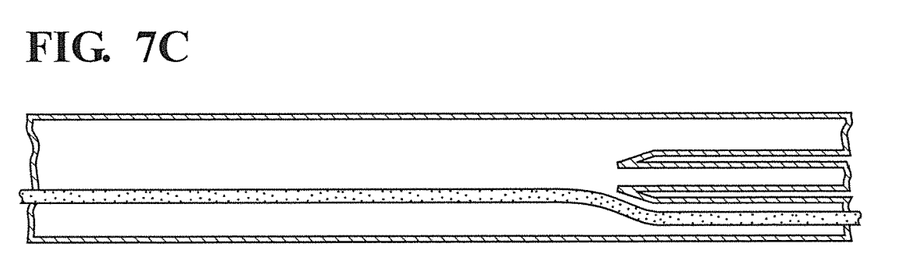

FIGS. 6A and 6B show a pair of chirp IDTs 70 and 72, each including a pair of gold electrodes deposited on a piezoelectric substrate. The comb-like electrode structure has a gradient finger spacing distance. The gradient in the finger period of the structure allows the excitation of SAW in a wide range of frequencies. A flow channel 74 is disposed asymmetrically between the EDTs such that the zero order node location is outside the working region 76. The flow channel has an inlet 78 and three outlets 80, 82 and 84.

The IDTs produce identical SAWs that interfere with each other to form a SSAW in the area between the two IDTs. These SSAWs leak into the adjacent fluid medium in the working region 76 and generate an acoustic radiation force on suspended objects. The acoustic radiation force drives objects to parallel nodes or anti-nodes in the pressure field, depending on their elastic properties. Most objects, including polystyrene beads and cells are pushed to nodes in the pressure field because of density and/or compressibility variations relative to the background medium.

Using chirp IDTs with varying input frequency, the apparatus 86 can shift the location of the pressure nodes generated from the SSAW interference. As a result, a single particle/cell which is trapped in the pressure node can be directed into the upper or bottom channel corresponding to a specific input frequency, as shown in FIGS. 6A and 6B. The distance shift of particles after the working region was 50 μm in one example, and can be further expanded according to the applications. This device can be integrated with an electric control to achieve a fast trigger to turn on the IDTs to sort the target objects.

An example particle sorting device comprises a PDMS channel and a pair of chirp IDTs. The device presented here has finger spacing (but not limited to) from 260 μm in one end to 300 μm in the other end, and works at the frequency range from 15 MHz to 13 MHz. The working frequency can be varied depending on the applications. The piezoelectric substrate used is Y-cut LiNbO3 with the crystal rotated around the X-axis by 128°. The fingers of the chirp IDT are aligned parallel to the X-axis, and therefore excite SAW propagating in the direction perpendicular to the X-axis.

Two major steps were involved in the fabrication of the device: (1) the fabrication of chirp IDTs involves photoresist lithography (SPR3012, MicroChem, Newton, Mass.), a double-layer metal (Cr/Au, 50 Å/800 Å) deposition on the wafer using an e-beam evaporator (Semicore Corp), and a lift-off process to remove the photoresist and form the IDTs. (2) The PDMS microchannels were designed with two branches that split the main channel into three outlet channels as shown in FIGS. 6A and 6B, and were fabricated using standard soft-lithography and mold-replica techniques. Finally, the IDT substrate and PDMS were bonded together under a microscope to complement the device after the treatment with oxygen plasma. The sorting device was mounted on the stage of an inverted microscope (Nikon TE2000U). An RF signal was generated from a function generator (Agilent E4422B) to drive the two chirp IDTs simultaneously. Solutions of bovine red blood cells (~6 μm in diameter, Innovative Research, Inc.), or fluorescent polystyrene beads (dragon green) with diameters of 15 μm were injected into the channel and 2-dimensionally focused by two sheath flows before the RF signals were applied. A CCD camera (CoolSNAP HQ2, Photometrics, Tucson, Ariz.) and a fast camera (Casio EX-F1) were connected to the microscope to capture the sorting process.

To demonstrate the functionality of the sorting method, the inventors first used it to direct 15 μm polystyrene beads, which have a density of 1.2 g/cm$^3$. The solution sample of beads are hydrodynamically focused in the center of main channel by two side flows, and passed through the SSAW working region where particles are sorted. In one example, the particles are directed into the upper or bottom channel at the frequency of 13.9 MHz and 14.5 MHz, respectively. When the SSAW is off, all particles go straight to the centre channel.

In this way, the inventors were able to sort two kinds of cells to upper and bottom outlet channels respectively. Due to the wide working frequency range of chirp IDTs, no precise alignment of a PDMS channel and the IDTs are required. We can find a specific sorting frequency for each outlet channel by simply sweeping the input frequency. And the device has the potential to expand the illustrated 3-outlet channels to multiple-outlet channels to sort more types of cells. The novel sorting technique shown here has the capability to sort diverse types of objects simultaneously. It is operated by fast electric control, and can be easily integrated into a complex system such as a focusing, detection, and sorting system. The cells are directly sorted from a continuous flow, which makes it particularly desirable for subsequent cell culturing.

Figure 8:
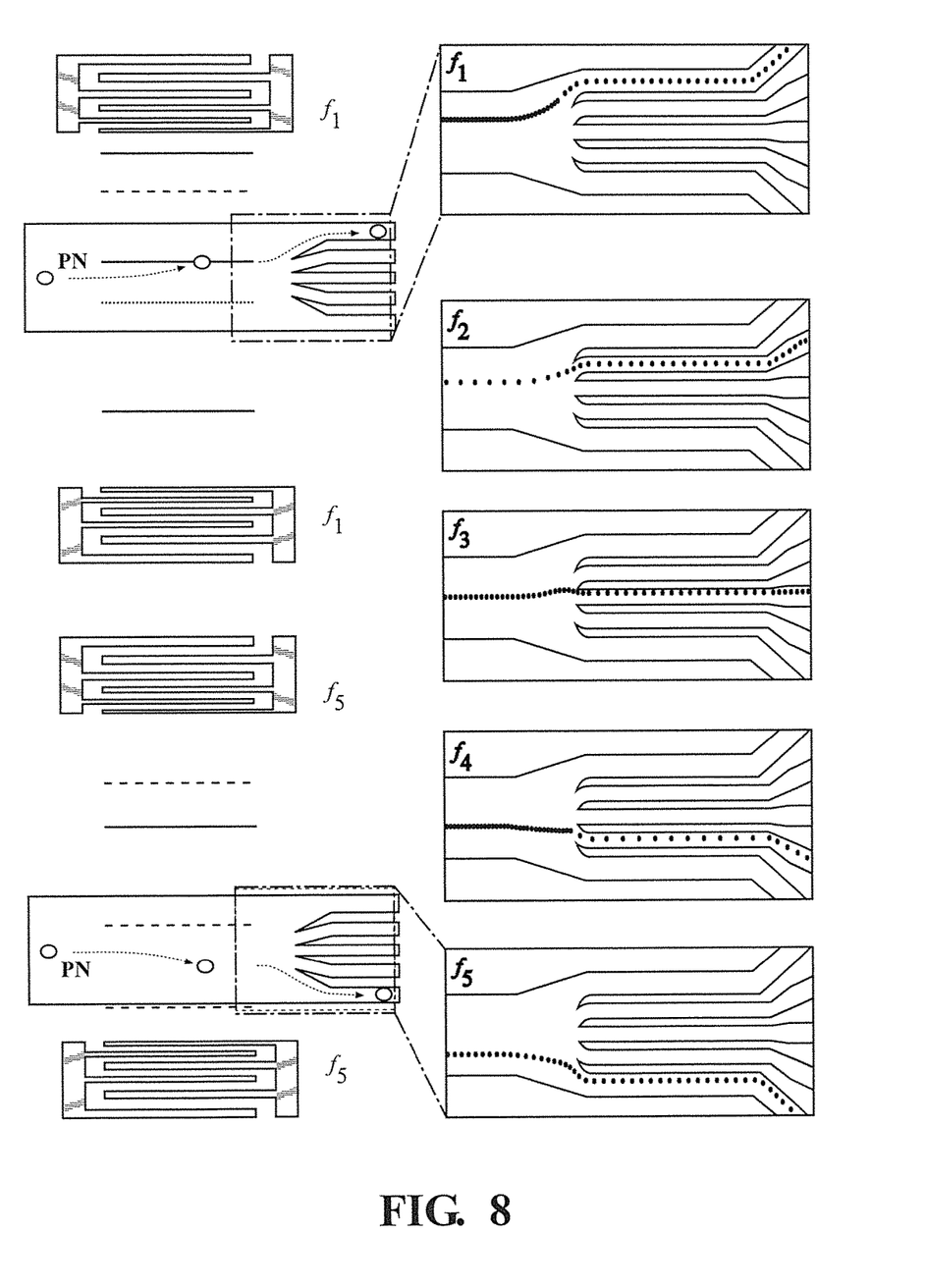
FIG. 8 is a schematic of two flow channel sorting apparatus according to an embodiment of the present invention, illustrating sorting of cells into five channels.

FIG. 8 is a schematic of a five-way sorting apparatus, and the right side of the Figure shows experimentally realized five-way sorting of blood cells, specifically sorting of human white blood cells (HL-60 cells) to five different outlet channels.

In some examples, a particle is characterized in the flow channel, or in an input channel through which the particle flows. Particle characterization may be optical (e.g. scattering, fluorescence, absorption, and the like), electrical, magnetic, or some combination of characterization. The characterization signals are sent to a controller, which adjusts the frequency and/or phase of the trandsucer signals to direct the particle into a desired output channel of a plurality of output channels, based on the characterization signals.

Cell sorting functions may be achieved by tuning the frequency to change the position of a pressure node (or anti-pressure node) in the suspension or other fluid medium. However, with similar configurations, similar functions to those described above (such as particle separation, sorting, and other manipulations) can be achieved by changing the phase, so that the position of the pressure node (or anti-pressure node) can be achieved through tuning the frequency and/or phase of the SAW. The frequency and phase of SAW are determined by the input signals to the transducers, and these can be controlled by an electronic control circuit.

Examples include immunology apparatus, where any type of cell may be labeled, and detection of the label (e.g. through fluorescence detection) is used to direct the labeled cell to a desired output channel. The number of selectable output channels for a particle is not limited by the presented examples, and may, for example, be in the range 2-20, in particular in the range 2-10. Label detection may be wavelength dependent, e.g. different fluorescence wavelengths may be used to sort cells into different channels. An electronic detector may be in communication with an electronic control circuit, the control circuit adjusting the SSAW as appropriate to direct the particle into a selected output channel.

A sorting device may be assembled on a low cost and disposable microfluidic chip and requires small sample volumes, which makes it an ideal alternate for research analysis and diagnostics.

Figure 9A:
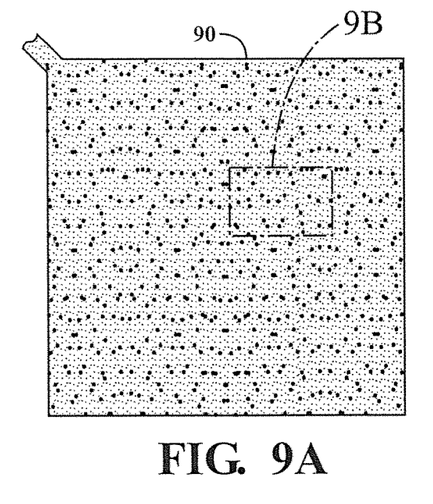
FIG. 9A is a drawing showing a mix of two types of particles in a working region of an apparatus in accordance with the present invention.
Figure 9B:
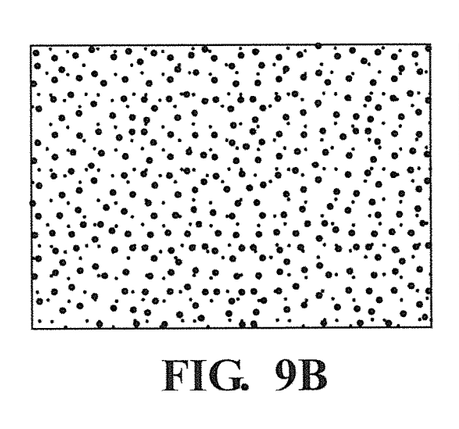
FIG. 9B is a magnified view of the portion of FIG. 9A indicated at 9B.
Figure 9C:
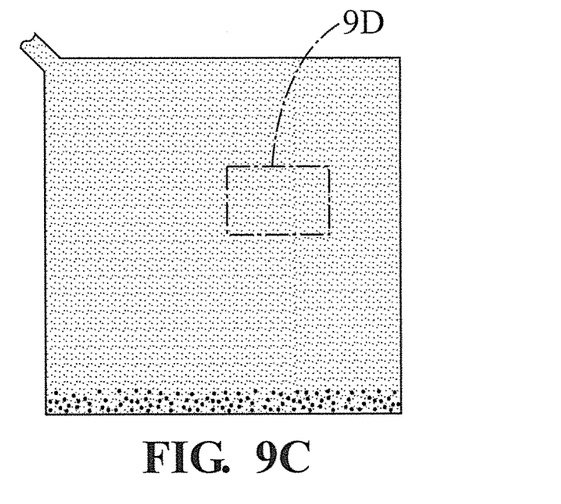
FIG. 9C is a drawing showing the working region of FIG. 9A after the larger particles have been swept away by adjusting standing surface acoustic waves.
Figure 9D:
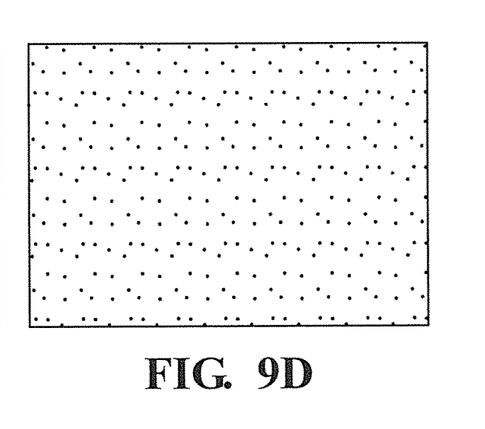
FIG. 9D is a magnified view of the portion of FIG. 9C indicated at 9D.

The present invention may also be used for cell separation. FIGS. 9A-D show an exemplary cell separation and concentration process. A square channel 90 is filled with particles of 10 μM and 1 μm, as shown in FIG. 9A and magnified in FIG. 9B. When we apply a sweeping frequency on this acoustic device to move the particles from the upper to the lower of the channel, using IDTs not shown in these Figures, all the big particles (10 microns diameter) are concentrated to the lower side of the channel. FIG. 9C shows the channel after the big particles are swept to the bottom. As shown in FIG. 9D, this leaves only small particles. Using this phenomenon, we can separate blood cells (7 μm-15 μm), platelet (~2 μm), and plasma from human whole blood cells.

Figure 10:
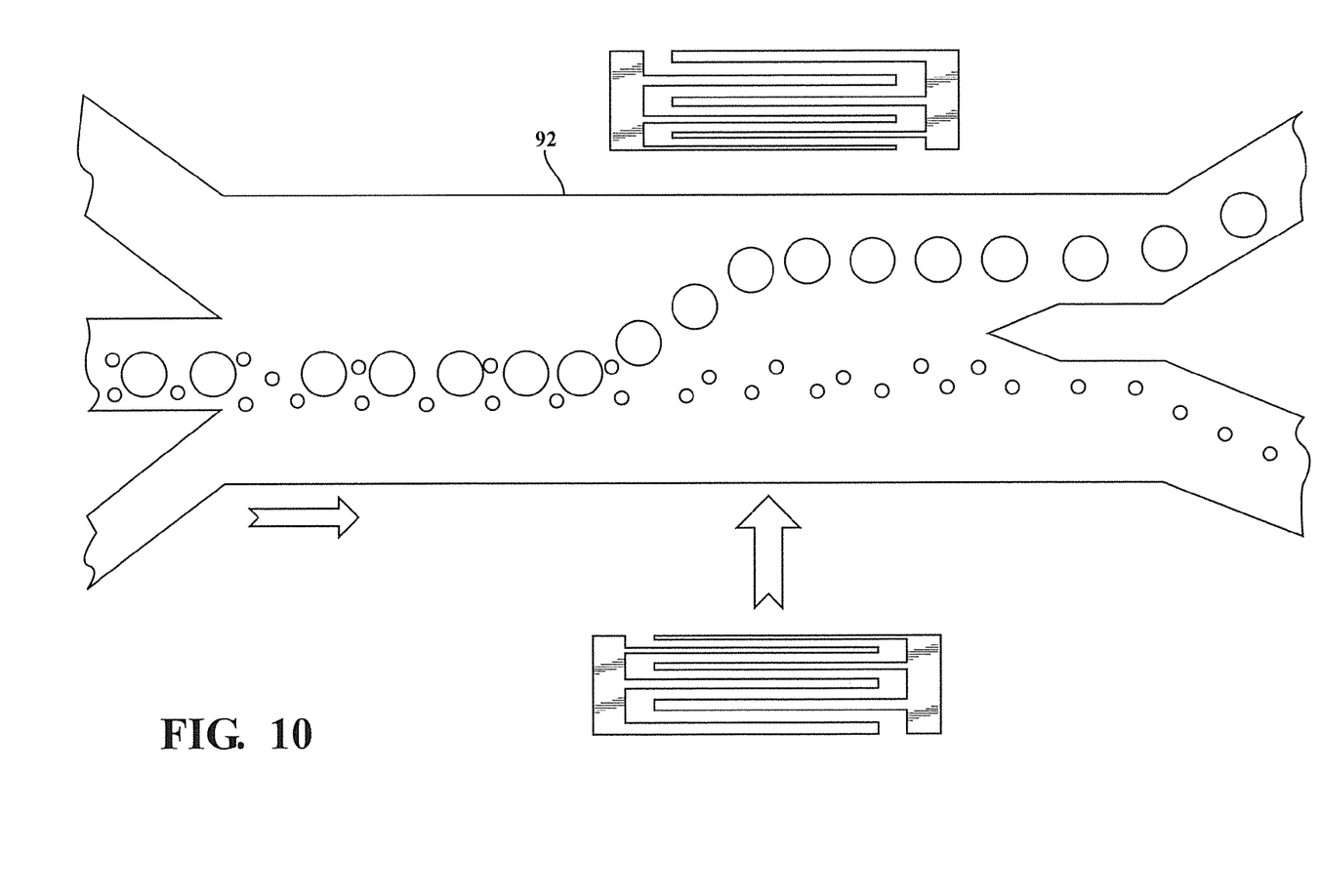
FIG. 10 is a schematic of an apparatus for manipulating particles in accordance with the present invention wherein large particles are separated from smaller particles as they flow through a working region.

FIG. 10 is a schematic showing particles/cells separation in a flow channel 92. When the solution with cells/particles of different size is infused into the channel 92, the tunable standing surface acoustic wave (SSAW) will push larger cells towards one side while the small ones remain in the original flow stream, so small cells/particles will be collected in upper outlet channel while large ones in lower channel. A sweeping signal may be used in this example.

Patents or publications mentioned in this specification are herein incorporated by reference to the same extent as if each individual publication was specifically and individually indicated to be incorporated by reference.

The invention is not restricted to the illustrative examples described above. Examples described are not intended to limit the scope of the invention. Changes therein, other combinations of elements, and other uses will occur to those skilled in the art. Modifications and variations of the present invention are possible in light of the above teachings and may be practiced otherwise than as specifically described while within the scope of the appended claims.

Having described our invention, we claim:

1. A method of manipulating a particle using surface acoustic waves, the method comprising:
   introducing a fluid suspension including the particle to a channel;
   generating tunable surface acoustic waves in the fluid suspension using a pair of variable frequency interdigital transducers (IDTs), the tunable surface acoustic waves generating a pressure field and exerting an acoustic radiation force on the particle, the acoustic radiation force pushing the particle to a node or antinode of the pressure field; and
   manipulating the particle by tuning the frequency and/or phase of the tunable surface acoustic waves, the tuning of the frequency and/or phase shifting the node or the antinode, the shifting of the node or antinode shifting a position of the particle within the channel.

2. The method of claim 1, wherein:
   the method is a method of particle sorting;
   the channel is a flow channel; and
   the frequency and/or phase of the tunable surface acoustic waves being tuned to direct a trajectory of the particle to a selected output channel of a plurality of output channels.

3. The method of claim 1, wherein the particle is an organic particle, an inorganic particle, a cell or a microorganism.

4. The method of claim 1, further comprising:
   generating additional tunable surface acoustic waves in the fluid suspension using an additional pair of variable frequency interdigital transducers (IDTs),
   the particle being further manipulated by adjusting the frequency and/or phase of the additional tunable surface acoustic waves.

5. The method of claim 1, wherein the tunable surface acoustic waves are standing surface acoustic waves.

6. A method of manipulating a particle using surface acoustic waves, the method comprising:
   introducing a fluid suspension including the particle to a channel;
   generating surface acoustic waves in the fluid suspension using a pair of variable frequency transducers; and
   manipulating the particle by adjusting the frequency and/or phase of the surface acoustic waves;
   wherein the surface acoustic waves include a zero order node located outside a working region of the channel, the zero order node being a stationary pressure node centered between the pair of variable frequency transducers.

7. The method of claim 6, wherein:
   the method is a method of particle sorting; and
   the frequency and/or phase of the surface acoustic waves being adjusted to direct a trajectory of the particle to a selected output channel of a plurality of output channels.

8. The method of claim 6, wherein the particle is an organic particle, an inorganic particle, a cell or a microorganism.

* * * * *